United States Patent
Wang

(10) Patent No.: US 7,168,172 B1
(45) Date of Patent: Jan. 30, 2007

(54) SAW

(76) Inventor: Kuang Pin Wang, No. 425, Ta-Tun 4th Street, Taichung City (TW)

( * ) Notice: Subject to any disclaimer, the term of this patent is extended or adjusted under 35 U.S.C. 154(b) by 0 days.

(21) Appl. No.: 11/415,205

(22) Filed: May 2, 2006

(51) Int. Cl.
*B27B 21/00* (2006.01)
*B26B 1/02* (2006.01)

(52) U.S. Cl. .............................. 30/517; 30/519; 30/161
(58) Field of Classification Search ............... 30/166.3, 30/155, 161, 517, 519
See application file for complete search history.

(56) References Cited

U.S. PATENT DOCUMENTS

| | | | | | |
|---|---|---|---|---|---|
| 1,638,749 | A | * | 8/1927 | Santoyo | 30/161 |
| 5,553,386 | A | * | 9/1996 | Hsu | 30/161 |
| 5,781,998 | A | * | 7/1998 | Stamper | 30/139 |
| 5,924,210 | A | * | 7/1999 | Hung | 30/519 |
| 5,926,962 | A | * | 7/1999 | Chen | 30/519 |
| 5,979,065 | A | * | 11/1999 | Hsu | 30/519 |
| 6,253,455 | B1 | * | 7/2001 | Eriksson et al. | 30/504 |
| 6,463,663 | B1 | * | 10/2002 | Kanzawa | 30/160 |
| 6,694,620 | B2 | * | 2/2004 | Kanzawa | 30/161 |

* cited by examiner

*Primary Examiner*—Hwei-Siu C. Payer
(74) *Attorney, Agent, or Firm*—Rosenberg, Klein & Lee

(57) ABSTRACT

A saw including a handle, a saw blade, a front protective bow and a rear protective bow pivotally connected with the front protective bow. When unfolding the saw blade, the saw blade presses the front protective bow and makes the front protective bow drive the rear protective bow to pivot away from the handle. At this time, the front protective bow, the rear protective bow and the handle define an enclosed space. When folding the saw blade, the saw blade presses the front protective bow to pivot toward the handle, whereby the front protective bow and the rear protective bow are at least partially accommodated in a receiving slot of the handle.

7 Claims, 6 Drawing Sheets

SAW

BACKGROUND OF THE INVENTION

The present invention is related to a saw, and more particularly to a foldable saw having a front protective bow and a rear protective bow. When operating the saw to saw a work piece, the front and rear protective bows protect a user's hand from being collided and injured.

FIG. 6 shows a conventional foldable saw having a handle 7 and a saw blade 8 pivotally connected with the handle 7. When not used, the saw blade 8 is folded and hidden in a slot (not shown) of the handle 7. In use, the saw blade 8 is unfolded and drawn out for sawing a work piece.

When a user holds the handle 7 with a hand to saw a work piece, it often takes place that the hand of the user is incautiously collided by the work piece and gets injured. Also, with such foldable saw, the user can hardly truly saw the work piece.

SUMMARY OF THE INVENTION

It is therefore a primary object of the present invention to provide a saw having a front protective bow and a rear protective bow. When operating the saw to saw a work piece, the front and rear protective bows are stretched to protect a user's hand from being collided and injured. When folding the saw, a user can directly push the saw blade into a receiving slot of the handle. At this time, the front and rear protective bows are also accommodated in the receiving slot together with the saw blade without occupying additional room.

According to the above object, the saw of the present invention includes:

a handle having a first pivot section at a first end and a second pivot section at a second end, one side of the handle being formed with a longitudinal receiving slot;

a saw blade having a body section, a saw-toothed section formed on one edge of the body section and a back section formed on another edge of the body section opposite to the saw-toothed section, a stopper block being disposed at a rear end of the body section, the saw blade being pivotally connected with the first pivot section of the handle;

a front protective bow also pivotally connected with the first pivot section of the handle, the front protective bow having a first push section facing the receiving slot of the handle and a second push section opposite to the first push section, the handle, the saw blade and the front protective bow being coaxially pivotally connected with each other; and a rear protective bow pivotally connected with the front protective bow and the second pivot section of the handle, the stopper block of the body section of the saw blade serving to press the first push section of the front protective bow and make the front protective bow drive the rear protective bow to pivot away from the handle, whereby the front protective bow, the rear protective bow and the handle define an enclosed space, the saw-toothed section serving to press the second push section of the front protective bow to pivot toward the handle, whereby the front protective bow and the rear protective bow are at least partially accommodated in the receiving slot of the handle.

The present invention can be best understood through the following description and accompanying drawings wherein:

DETAILED DESCRIPTION OF THE PREFERRED EMBODIMENTS

Figure 1:
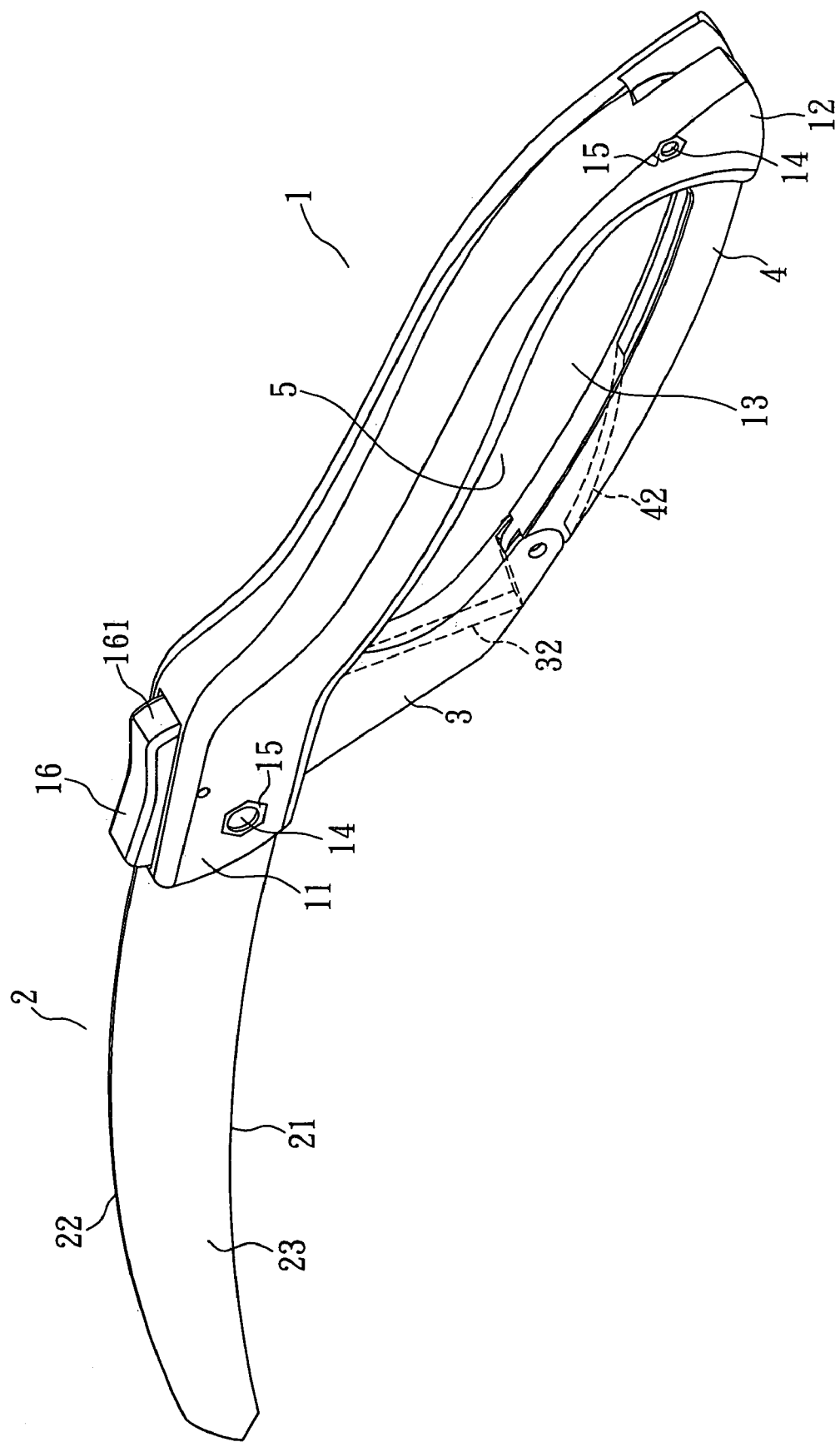
FIG. 1 is a perspective assembled view of the saw of the present invention.
Figure 2:
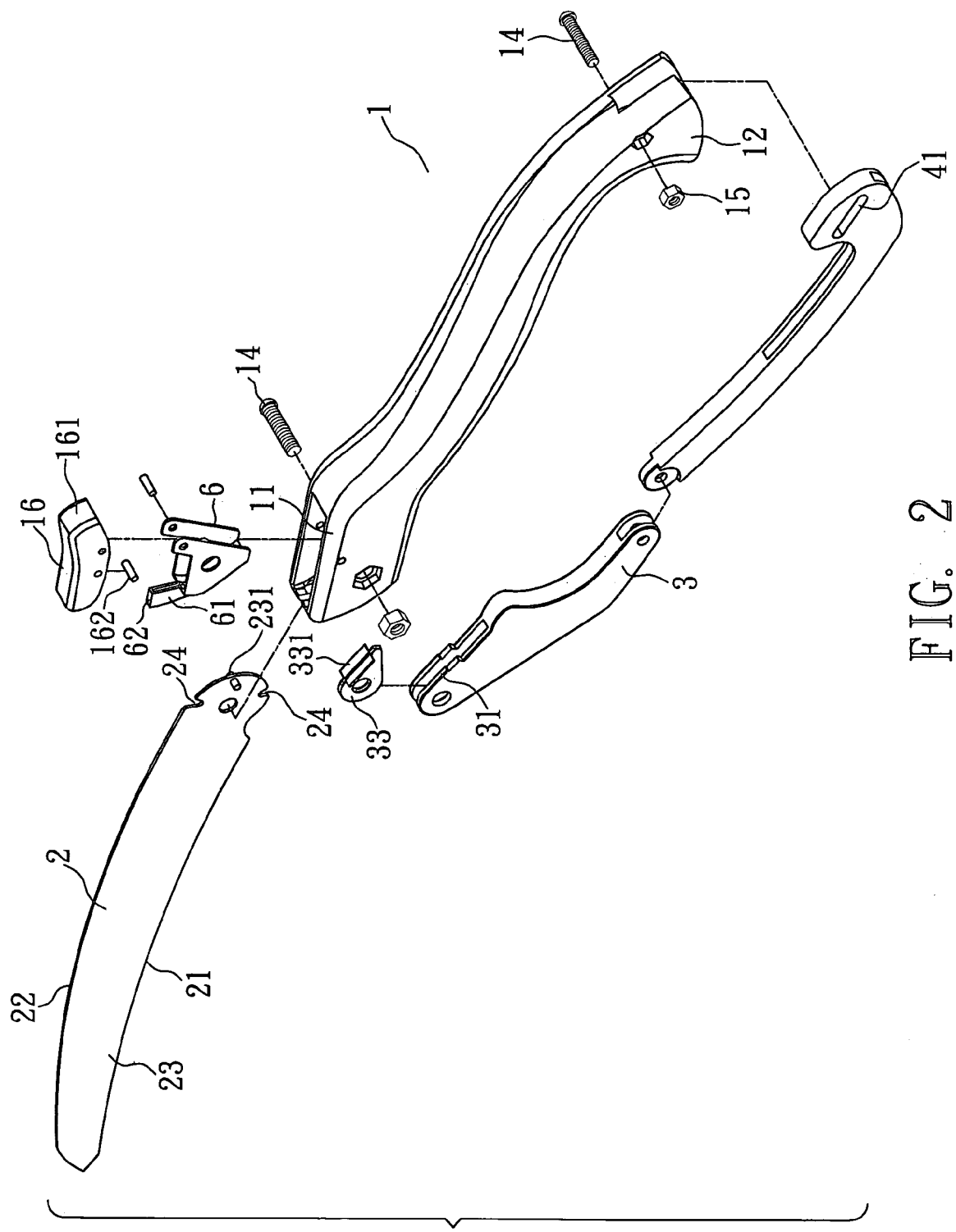
FIG. 2 is a perspective exploded view of the saw of the present invention.
Figure 3:
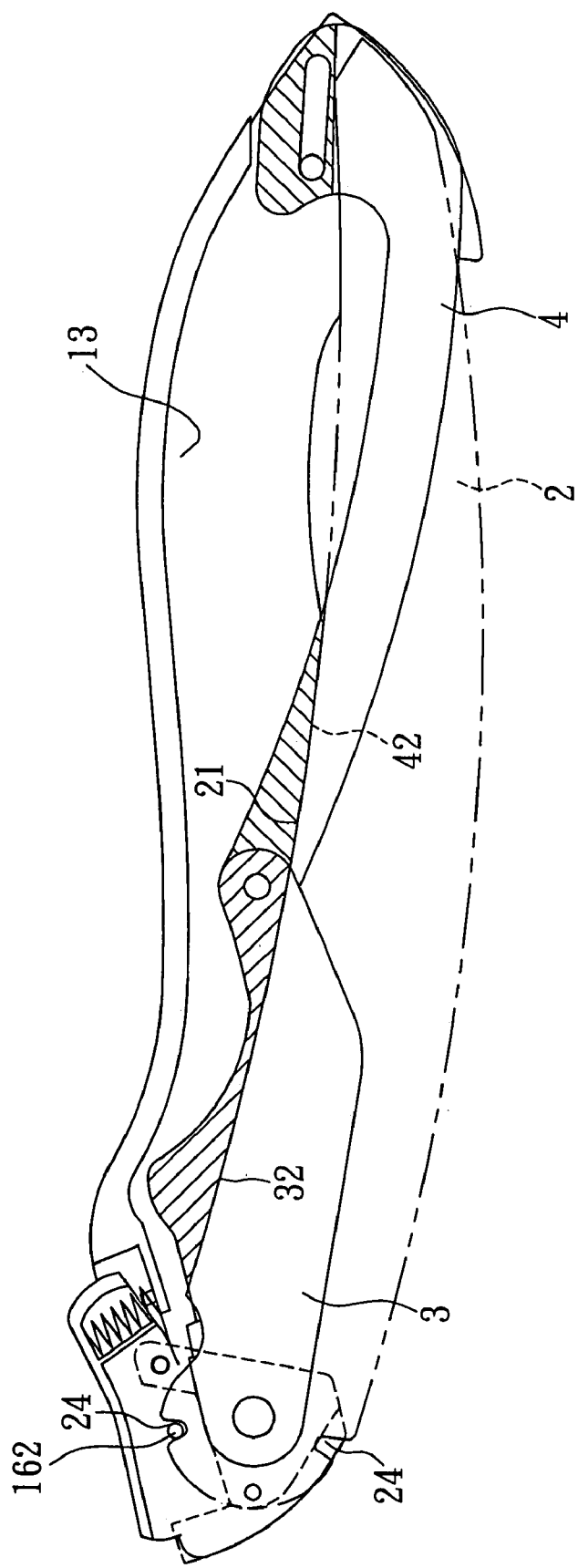
FIG. 3 is a side partially sectional view of the saw of the present invention in a folded state.

Please refer to FIGS. 1 to 3. The saw of the present invention includes a handle 1, a saw blade 2, a front protective bow 3 and a rear protective bow 4.

The handle 1 has a first pivot section 11 at a first end and a second pivot section 12 at a second end. In addition, one side of the handle 1 is formed with a longitudinal receiving slot 13.

In this embodiment, the first pivot section 11 of the handle 1 is coaxially pivotally connected with the saw blade 2 and the front protective bow 3 via a pivot shaft 14. The pivot shaft 14 is fastened with a nut 15. A rear end of the rear protective bow 4 is formed with a slot 41. A pivot shaft 14 is slidably fitted through the second pivot section 12 and the slot 41 of the rear protective bow 4 and fastened with a nut 15, whereby the second pivot section 12 is pivotally connected with the rear protective bow 4. The front and rear protective bows 3, 4 are further pivotally connected with each other.

The saw blade 2 has a body section 23, a saw-toothed section 21 formed on one edge of the body section 23 and a back section 22 formed on another edge of the body section 23 opposite to the saw-toothed section 21. The saw-toothed section 21 has multiple saw teeth. A stopper block 231 is disposed at a rear end of the body section 23.

A locating member 16 is arranged on another side of the handle 1 opposite to the receiving slot 13 near the first pivot section 11. A middle section of the locating member 16 is pivotally connected with the handle 1. A first end of the locating member 16 has a press section 161. A second end of the locating member 16 has a locating pin 162. The back section 22 of the saw blade 2 is formed with two locating notches 24 on two sides of the stopper block 231. A resilient member 163 is disposed between the locating member 16 and the handle 1 for resiliently pushing the press section 161. The press section 161 can be pressed to chuck the locating pin 162 in one of the locating notches 24 so as to locate the saw blade 2.

The front protective bow 3 has a first push section 31 facing the receiving slot 13 of the handle 1 and a second push section 32 opposite to the first push section 31. A protective member 33 is mounted in the first push section 31 of the front protective bow 3. The protective member 33 has two wings 331 covering the surface of the first push section 31 for protecting the surface of the first push section 31 from being worn.

The rear protective bow 4 is pivotally connected with the front protective bow 3 and the second pivot section 12 of the handle 1. The rear protective bow 4 has a third push section 42 on the same side as the second push section 32 of the front protective bow 3. The surfaces of the second push section 32 and the third push section 42 are arced faces adapted to the arc of the saw-toothed section 21 of the saw blade 2, whereby the saw-toothed section 21 can snugly abut against the arced faces of the second and third push sections 32, 42 as shown in FIG. 3.

Accordingly, the saw blade 2 can uniformly contact with the surfaces of the second and third push sections 32, 42. This can avoid concentration of stress applied to the saw-toothed section 21 of the saw blade 2. Also, the saw-toothed section 21 of the saw blade 2 is prevented from breaking due to collision between the saw-toothed section 21 and the second and third push sections 32, 42.

Figure 4:
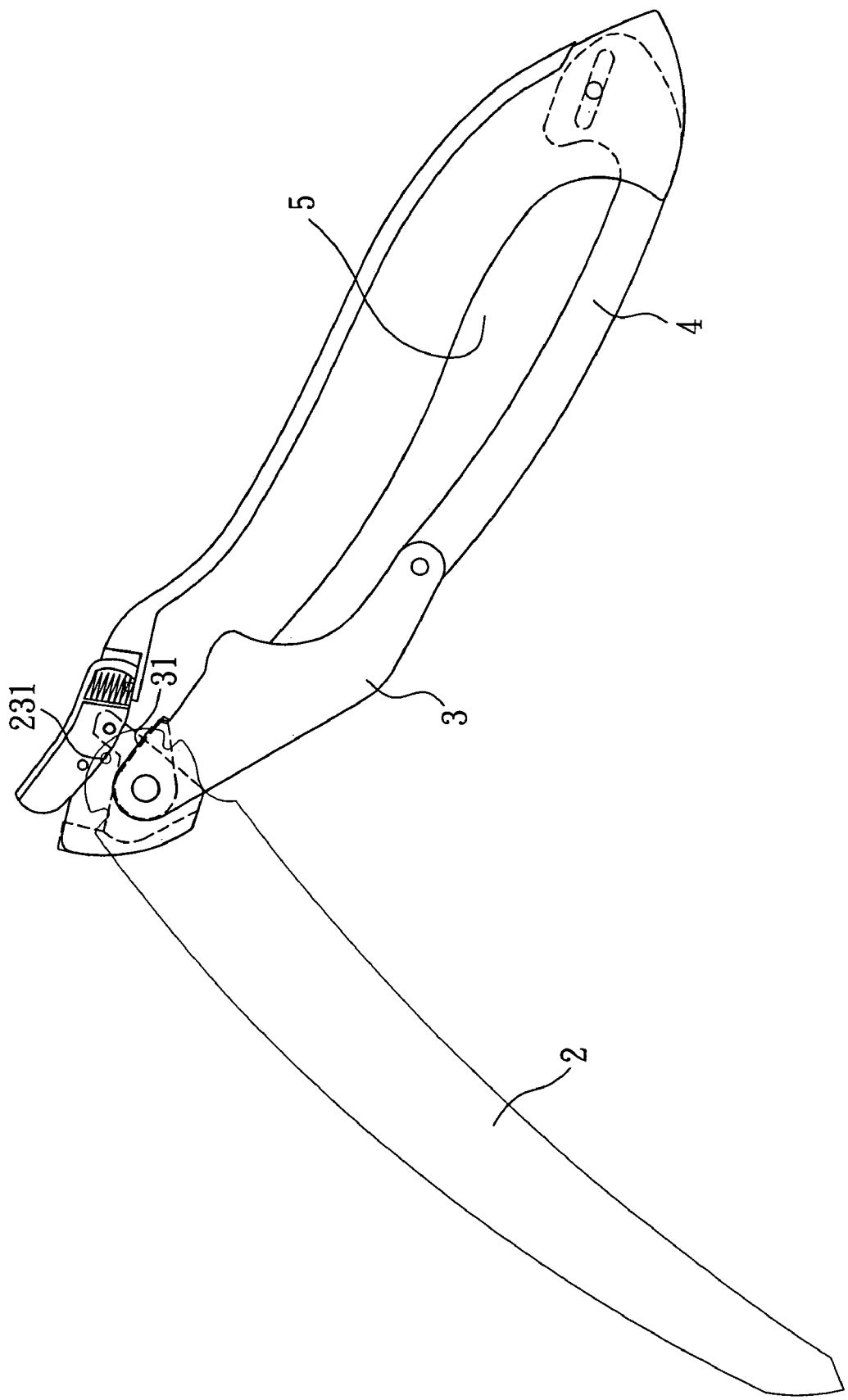
FIG. 4 is a view of the saw of the present invention in a partially unfolded state.
Figure 5:
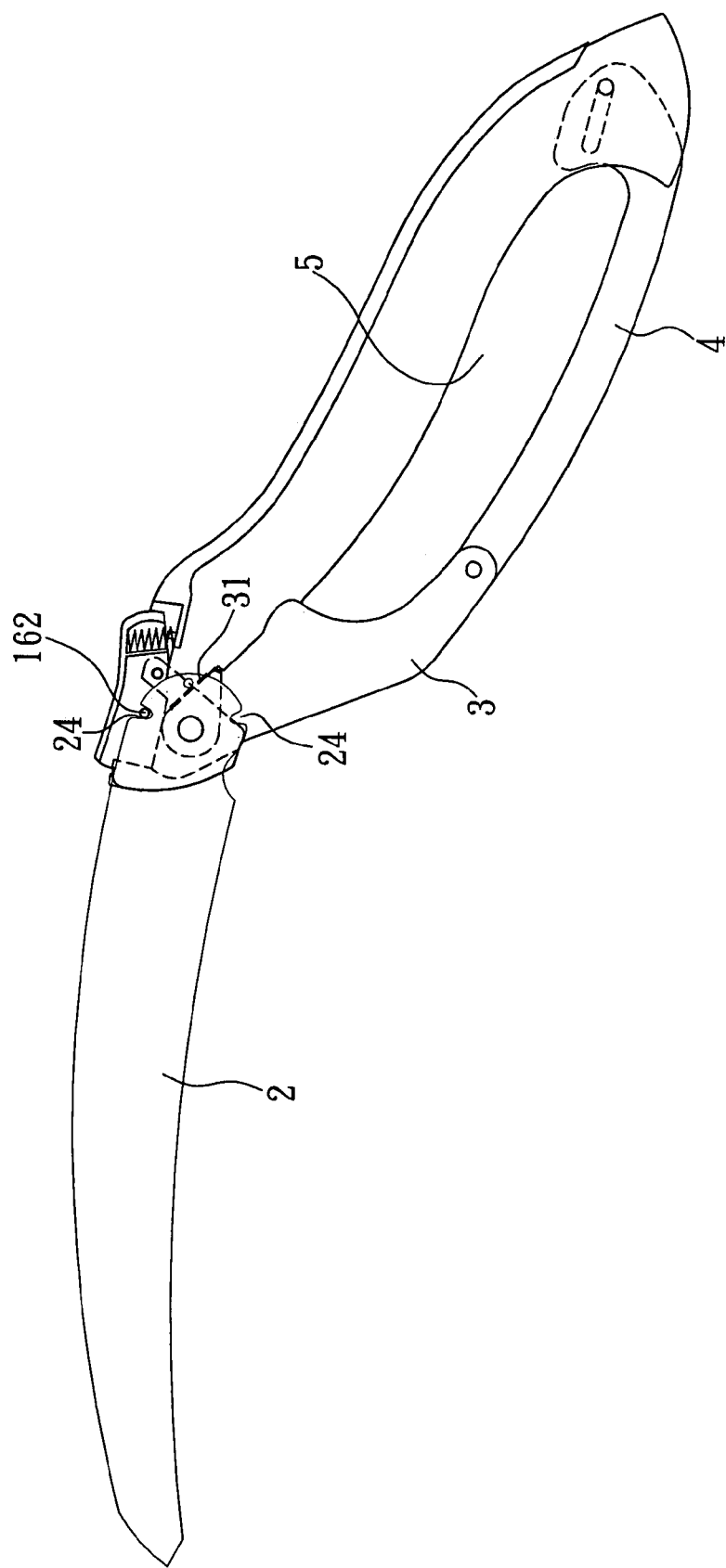
FIG. 5 is a view of the saw of the present invention in a totally unfolded state.
Figure 6:
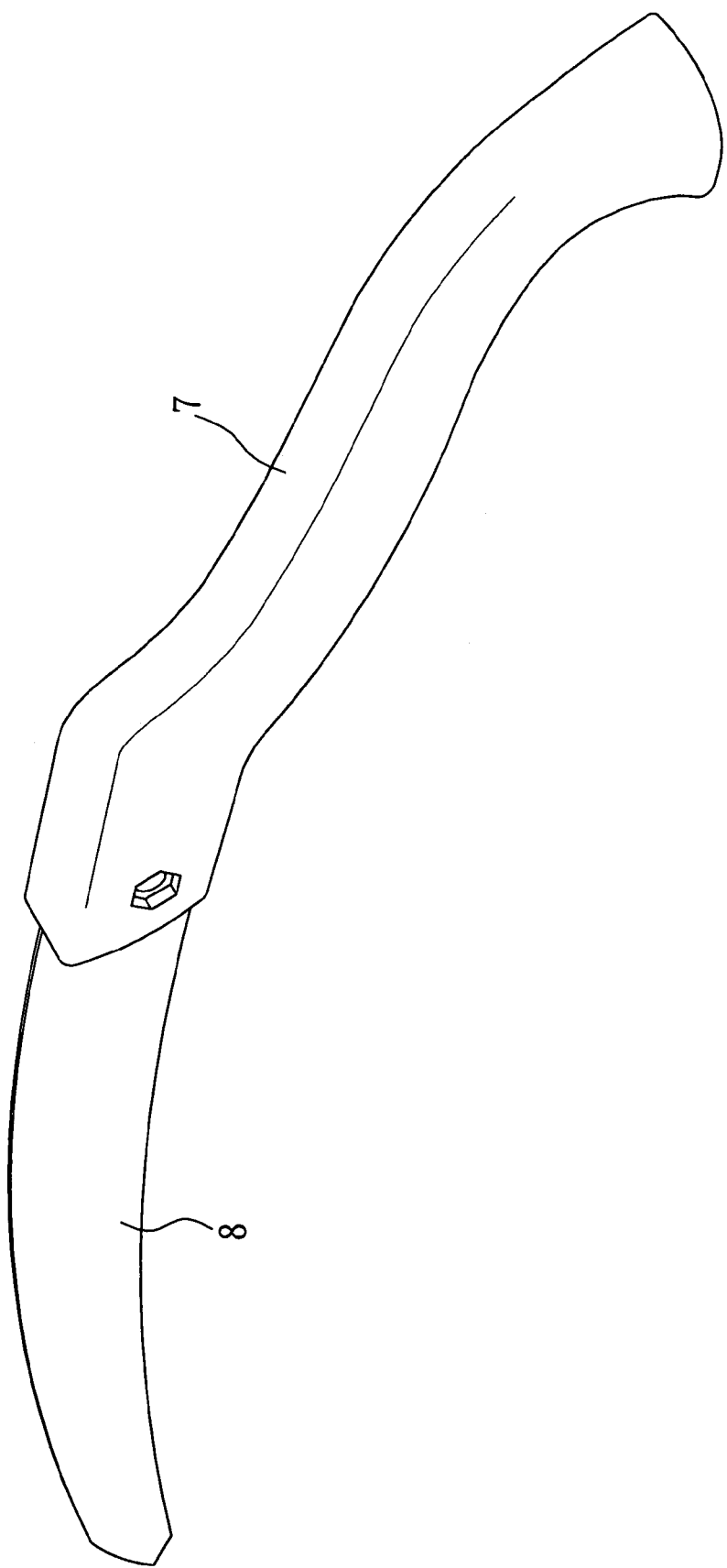
FIG. 6 is a perspective view of a conventional foldable saw.

The stopper block 231 of the body section 23 of the saw blade 2 can press the first push section 31 of the front protective bow 3, whereby the front protective bow 3 can drive the rear protective bow 4 to pivot away from the handle 1 (as shown in FIG. 4). At this time, the front protective bow 3, the rear protective bow 4 and the handle 1 define an enclosed space 5 as shown in FIG. 5. Alternatively, the saw-toothed section 21 can press the second push section 32 of the front protective bow 3 to pivot toward the handle 1. At this time, the front protective bow 3 and the rear protective bow 4 are at least partially accommodated in the receiving slot 13 of the handle 1 as shown in FIG. 3.

Referring to FIGS. 3 and 4, when folding the saw blade 2, a user can directly push the saw blade 2 into the receiving slot 13. At this time, the front and rear protective bows 3, 4 are also accommodated in the receiving slot 13 together with the saw blade 2. It is quite convenient to fold the saw for reducing the occupied room.

Referring to FIGS. 1 and 5, in use of the saw, a user's hand holds the handle 1 with the fingers positioned in the enclosed space 5 defined by the front protective bow 3, the rear protective bow 4 and the handle 1. Therefore, when operating the saw to saw a work piece, the front and rear protective bows 3, 4 can protect the user's hand from being collided and injured. Accordingly, the safety in operation can be ensured and the user can more concentrate his attention on the work without worrying about the danger of injury of his hand.

Referring to FIG. 2, a stopper member 6 is disposed in the first pivot section 11 of the handle 1. The stopper member 6 has two opposite stopper walls 61 and an upper wall 62 bridged between the two stopper walls 61. The upper wall 62 faces the back section 22 of the saw blade 2, whereby the back section 22 of the saw blade 2 can abut against the upper wall 62. In sawing operation, the upper wall 62 serves to effectively support the saw blade 2 and prevent the saw blade 2 from over-swinging.

The above embodiments are only used to illustrate the present invention, not intended to limit the scope thereof. Many modifications of the above embodiments can be made without departing from the spirit of the present invention.

What is claimed is:

1. A saw comprising:
   a handle having a first pivot section at a first end and a second pivot section at a second end, one side of the handle being formed with a longitudinal receiving slot;
   a saw blade having a body section, a saw-toothed section formed on one edge of the body section and a back section formed on another edge of the body section opposite to the saw-toothed section, a stopper block being disposed at a rear end of the body section, the saw blade being pivotally connected with the first pivot section of the handle;
   a front protective bow also pivotally connected with the first pivot section of the handle, the front protective bow having a first push section facing the receiving slot of the handle and a second push section opposite to the first push section, the handle, the saw blade and the front protective bow being coaxially pivotally connected with each other; and
   a rear protective bow pivotally connected with the front protective bow and the second pivot section of the handle, the stopper block of the body section of the saw blade serving to press the first push section of the front protective bow and make the front protective bow drive the rear protective bow to pivot away from the handle, whereby the front protective bow, the rear protective bow and the handle define an enclosed space, the saw-toothed section serving to press the second push section of the front protective bow to pivot toward the handle, whereby the front protective bow and the rear protective bow are at least partially accommodated in the receiving slot of the handle.

2. The saw as claimed in claim 1, wherein a locating member is arranged on another side of the handle opposite to the receiving slot near the first pivot section, a middle section of the locating member being pivotally connected with the handle, a first end of the locating member having a press section, a second end of the locating member having a locating pin, the back section of the saw blade being formed with two locating notches on two sides of the stopper block, a resilient member being disposed between the locating member and the handle for resiliently pushing the press section, whereby the press section can be pressed to chuck the locating pin of the locating member in one of the locating notches so as to locate the saw blade.

3. The saw as claimed in claim 1, wherein the first pivot section of the handle, the saw blade and the front protective bow are coaxially pivotally connected with each other via a first pivot shaft, a rear end of the rear protective bow being formed with a slot, a second pivot shaft being slidably fitted through the second pivot section and the slot of the rear protective bow to pivotally connect the second pivot section with the rear protective bow, the front and rear protective bows being further pivotally connected with each other.

4. The saw as claimed in claim 1, wherein the saw-toothed section of the saw blade has multiple saw teeth.

5. The saw as claimed in claim 1, wherein a stopper member is disposed in the first pivot section of the handle, the stopper member having two opposite stopper walls and an upper wall bridged between the two stopper walls, the upper wall facing the back section of the saw blade, whereby the back section of the saw blade can abut against the upper wall.

6. The saw as claimed in claim 1, wherein a protective member is mounted in the first push section of the front protective bow, the protective member having two wings covering a surface of the first push section for protecting the surface of the first push section from being worn.

7. The saw as claimed in claim 1, wherein the rear protective bow has a third push section on the same side as the second push section of the front protective bow, the second push section and the third push section having arced surfaces adapted to the arc of the saw-toothed section of the saw blade, whereby the saw-toothed section can snugly abut against the arced surfaces of the second and third push sections.

* * * * *